US 7,004,988 B2

(12) United States Patent
Letzel

(10) Patent No.: US 7,004,988 B2
(45) Date of Patent: Feb. 28, 2006

(54) GAS-LIQUID SEPARATOR

(75) Inventor: Hugo Martijn Letzel, Amsterdam (NL)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 10/472,358

(22) PCT Filed: Mar. 14, 2002

(86) PCT No.: PCT/EP02/03075

§ 371 (c)(1),
(2), (4) Date: Dec. 3, 2003

(87) PCT Pub. No.: WO02/074404

PCT Pub. Date: Sep. 26, 2002

(65) Prior Publication Data

US 2004/0107682 A1 Jun. 10, 2004

(30) Foreign Application Priority Data

Mar. 19, 2001 (EP) .................................. 01201031

(51) Int. Cl.
*B01D 45/00* (2006.01)
*B01D 50/00* (2006.01)
(52) U.S. Cl. .............................. 55/444; 55/320; 55/325; 55/326; 55/327; 96/189; 96/190; 261/114.5
(58) Field of Classification Search ................. 55/320, 55/325, 326, 327, 444; 96/188, 189, 190, 96/358; 261/113, 114.1, 114.5
See application file for complete search history.

(56) References Cited

U.S. PATENT DOCUMENTS

| 2,986,233 A | | 5/1961 | Yap et al. | |
| 3,616,744 A | * | 11/1971 | Jensen ..................... | 126/299 E |
| 4,361,469 A | | 11/1982 | Trutna | |
| 4,767,424 A | | 8/1988 | McEwan | |
| 4,818,346 A | | 4/1989 | Bentham et al. | |
| 5,683,629 A | | 11/1997 | Konijn | |
| 5,695,548 A | | 12/1997 | Trutna | |
| 6,131,891 A | | 10/2000 | Resetarits et al. | |

FOREIGN PATENT DOCUMENTS

EP 0 751 808 1/1997

OTHER PUBLICATIONS

International Search Report dated Aug. 8, 2002.
Trans IchemE, vol. 77, Part A, Oct. 1999, pp. 619-626.

* cited by examiner

*Primary Examiner*—Robert A. Hopkins
(74) *Attorney, Agent, or Firm*—Charles W. Stewart

(57) ABSTRACT

A gas-liquid separator having two or more vertically spaced rows of parallel horizontally spaced upwardly facing gutters, the gutters having an upwardly extending gutter wall, wherein the upper end of the gutter wall is provided with a U-turn deflector.

24 Claims, 6 Drawing Sheets

GAS-LIQUID SEPARATOR

FIELD OF THE INVENTION

The invention is related to a gas-liquid separator comprising two or more vertically spaced rows of parallel horizontally spaced upwardly facing gutters, said gutters having an upwardly extending gutter wall.

BACKGROUND OF THE INVENTION

Such a gas-liquid separator is known from U.S. Pat. No. 4,361,469 and is also described in U.S. Pat. No. 5,695,548 and in Trans IChemE, vol. 77, Part A, October, pages 619–626. According to U.S. Pat. No. 4,361,469 the disclosed gas-liquid separator consists of a plurality of vertically spaced rows or levels of horizontally spaced parallel gutters. The individual gutters are each in the form of an elongate open top gutter of rectangular cross section having a bottom and side walls. The gutters are spaced apart vertically and horizontally. In use an up-flowing gas-liquid mixture having entrained liquid droplets carried thereby will vertically pass the rows of gutters. Because of the changes in flow direction, due to the particular gutter configuration, the gas-liquid mixture is thrust against the gutters, thereby separating the liquid droplets from the mixture. The liquid thereby falls into the open upper side of the gutters. Because the gutters are somewhat tilted the liquid will flow to the lower end of the gutter, at which point the liquid can be collected and transported to a lower level without being de-entrained by the upwardly moving gas and liquid.

SUMMARY OF THE INVENTION

A disadvantage of the above-identified gas-liquid separator is that the liquid separation is not satisfactory. The object of the present invention is to improve the separation efficiency of the gas-liquid separator as described above.

This objective is achieved by the following gas-liquid separator. Gas-liquid separator comprising two or more vertically spaced rows of parallel horizontally spaced upwardly facing gutters, said gutters having an upwardly extending gutter wall, wherein the upper end of the gutter wall is provided with a U-turn deflector.

DETAILED DESCRIPTION OF THE INVENTION

Figure 1:
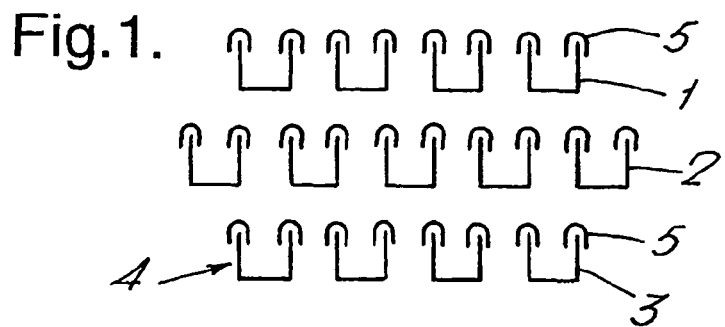
FIG. 1 shows a cross-sectional view of three vertically spaced rows of gutters of the inventive gas-liquid separator.

It has been found that the gas-liquid separator according to the invention shows an improved separation efficiency as compared to the gas-liquid separator as disclosed in the prior art. Without being bound to the following theory applicant believes that the improved separation efficiency is attributed to the fact that droplets which accumulate on the outside wall of the gutter will be less re-entrained at the upper end of the gutter wall by the upwardly moving gas because of the presence of the U-turn deflectors. Additionally some secondary gas will also be deflected by the U-turn deflector, thereby positively influencing the flow of liquid from the outside gutter wall into the interior of the gutter.

The gas-liquid separator according to the present invention may find application as a stand alone separator application, wherein the separator forms part of a vessel provided with a gas-liquid inlet and a liquid outlet at its lower end and a gas outlet at its upper end and means to transport the separated liquid downwards from the gutters to the liquid outlet, such that the downwards moving liquid is not obstructed by up-flowing gas-liquid mixture. Such a means can be a downcomer positioned near the vessel wall. To further improve the gas-liquid separation the vessel may be suitably provided with a coalescer below the gutter device. The gutter separator will be provided with means to transport the liquid downwards to the liquid outlet. The gas-liquid inlet may be a device, which enhances a first gas-liquid separation as for example a Shell Schoepentoeter (Shell Schoepentoeter is a trademark). GB-A-1119699 describes such a Shell Schoepentoeter.

The gas-liquid separator according to the present invention may also be suitably used in a gas-liquid contacting column, wherein gas and liquid are contacted counter-currently. Preferred gas-liquid contacting columns are distillation and absorption columns. In absorption processes a downwardly moving liquid is contacted with a upwardly moving gas and one or more components is transferred from the gas to the liquid or vice versa. In a distillation process one or more components are separated from a feed due to differences in their boiling points. In a distillation process the feed is typically supplied to an intermediate position in the column, wherein trays are present above and below said inlet position. Such a column is further provided with reboiler, condensation and reflux means. The preferred Column for counter-currently contacting gas and liquid has inlets and outlets for fluids, is provided with a plurality of horizontal contact trays arranged axially spaced apart in the column, each contact tray being provided with passages, and which column is further provided with a plurality of horizontal separation trays comprising the separator according to the present invention and means for removing liquid from the separation tray to a lower position, each separation tray being arranged above a contact tray. The configuration of separation and contacting trays is known from the aforementioned U.S. Pat. No. 4,361,469 and U.S. Pat. No. 5,695,548 both of which are hereby incorporated by reference. The column provided with the improved separation device according to the invention will achieve a better performance. The improvement in performance is that the maximum gas flow rate through the column is higher, wherein the maximum gas flow rate is the gas flow rate at which entrainment of liquid by the upwards flowing gas starts.

The gas-liquid separator may also be advantageously be used as separator tray in the gas-liquid contacting column of EP-A-751808 hereby incorporated by reference. This column is provided with a plurality of contact trays, wherein above a contact tray a separation tray is provided. Said separation tray is provided with swirl tubes to achieve the gas-liquid separation. This tray is also referred to as a "swirl deck". The present separator has the advantage over the swirl deck in that it is much more simple to fabricate, requires less column height to install and has a lower pressure drop when in use.

Preferably the gas-liquid separator according to the invention comprises of two or more vertically spaced rows of gutters. In a gas-liquid separator application the maximum number of rows will be determined by the required separation efficiency required from the gutter separator according to the invention. If the gutter separator is used in gas-liquid contacting column, as described above in more detail, the number of rows will preferably be from 2 to 8, more preferably from 2 to 4. More rows are possible. However this would require more column height.

The gutters of one row may run parallel or non-parallel to the gutters of a next or further vertically spaced row. For fabrication reasons the gutters of the different vertically spaced rows will suitably run parallel with respect to each other. The gutters may have any cross-sectional design, provided that they are open at its upper side and closed at its lower side and provided with a side-wall which terminates at its upper end. Examples of suitable cross-sectional designs are the U-form, the V-form and the designs disclosed in U.S. Pat. No. 4,361,469 hereby incorporated by reference. The dimensions of the gutters and the distance between the gutters in one row and the distance between rows may be as disclosed in U.S. Pat. No. 4,361,469 hereby incorporated by reference.

The gutters may be positioned horizontally but are preferably tilted such that the liquid can more freely flow to the side of the separator as for example described in U.S. Pat. No. 4,361,469 hereby incorporated by reference. Preferably the gutters are not tilted to much because then the separator would become to high. An optimal angle can be easily determined by one skilled in the art based on these considerations. The U-turn deflector may run along the entire gutter wall or may be present at regular intervals. Preferably the U-turn deflector is present along substantially the entire length of both of the upwardly extending gutter walls.

The design of the U-turn deflector should be such that re-entrainment of liquid flowing upwards on the outer wall of the gutter is avoided and that this liquid and the secondary gas is guided into the gutter. For this reason the U-turn deflector is spaced away from the upper end of the gutter walls, thereby allowing an opening between the U-turn deflector and the upper end of the gutter wall for passage of liquid and secondary gas. The U-turn deflector can have a curved or hooked design. The deflector can be fixed to the gutter by means of for example welding.

The invention will be further illustrated by making use of FIGS. 1–6.

FIG. 1 shows a cross-sectional view of three vertically spaced rows (1, 2, 3) of gutters (4). The gutters (4) have a boxed design which gutter has two upwardly extending elongated gutter walls, each wall provided with a U-turn deflector (5).

Figure 2:
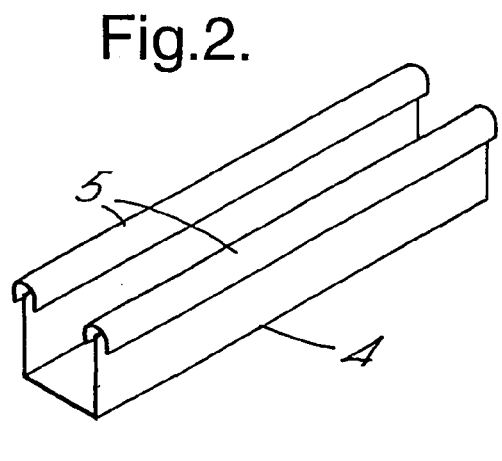
FIG. 2 shows an individual boxed design gutter provided with U-turn deflector of the invention.
Figure 3:
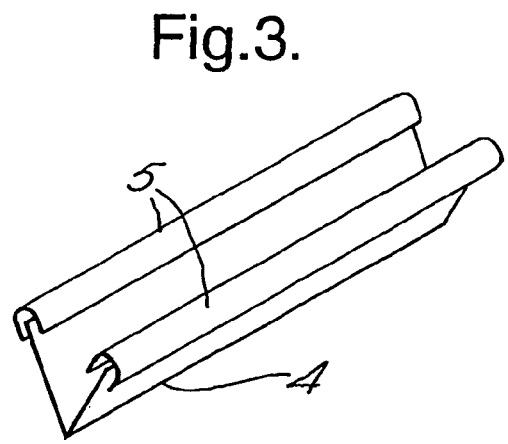
FIG. 3 shows a V-shaped gutter provided with U-turn deflector of the invention.

FIG. 2 shows an individual boxed design gutter (4) provided with U-turn deflector (5). FIG. 3 shows a V-shaped gutter (4) provided with U-turn deflector (5).

Figure 4:
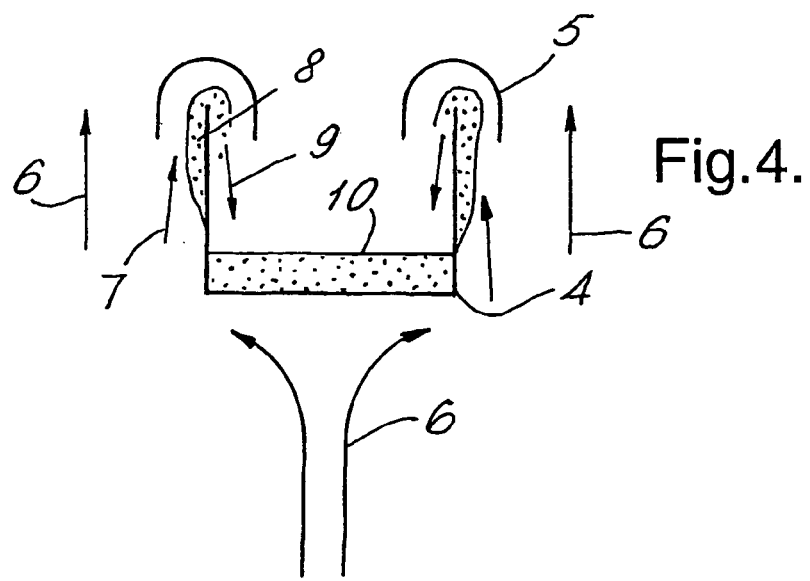
FIG. 4 shows how a stream of gas and liquid droplets will flow along the gutter of the invention.

FIG. 4 shows how a stream (6) of gas and liquid droplets will flow along the gutter (4). As shown droplets accumulate on the gutter wall as a liquid film (8) which flows upwards along the gutter wall. The U-turn deflectors (5) avoid that this liquid film re-entrains from the gutter. Instead the liquid from the film flows into the gutter via (9). Some secondary gas (7) enhances this flow.

Figure 5:
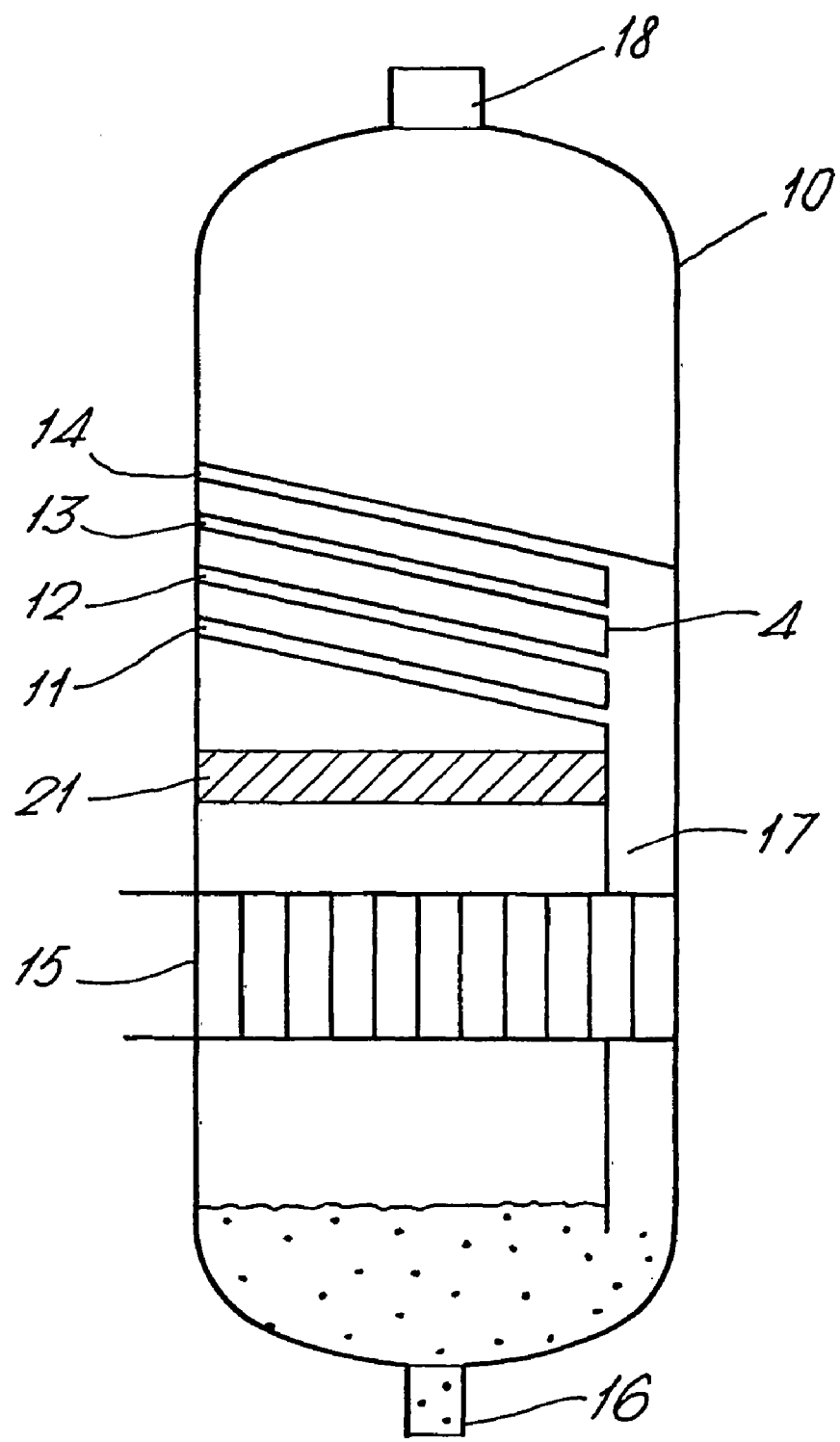
FIG. 5 shows a gas-liquid separator provided with the gutter separator according to the invention.

FIG. 5 shows a gas-liquid separator provided with the gutter separator according to the invention. The separator vessel (10) is provided with 4 vertically spaced rows (11, 12, 13, 14) of parallel and horizontally spaced tilted gutters (4). The vessel is also provided with an inlet device (15) according to FIG. 4 of GB-A-1119699 to supply the gas liquid mixture, a liquid outlet (16) fluidly connected to the lower end of the gutters (4) via downcomer (17) and a gas outlet (18). Below the gutters a coalescer (21) is provided to increase liquid droplet size in the up-flowing gas-liquid mixture.

Figure 6:
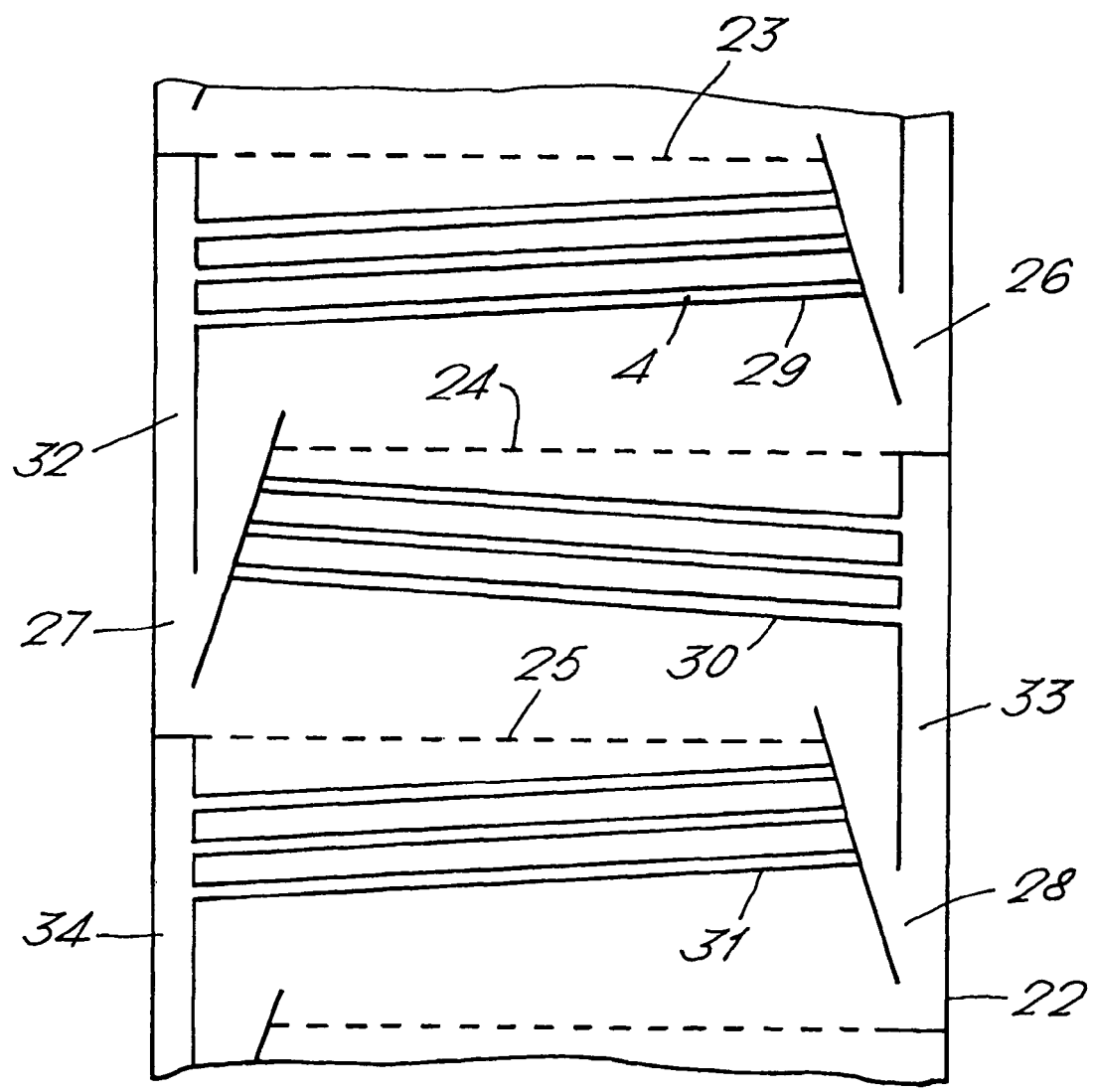
FIG. 6 shows part of a counter-current gas-liquid contacting column provided with horizontal contact trays arranged axially spaced apart in the column.

FIG. 6 shows part of a counter-current gas-liquid contacting column (22) provided with horizontal contact trays (23), (24) and (25) arranged axially spaced apart in the column (22). The horizontal contact trays (23), (24) and (25) are so-called sieve trays. A sieve tray is a flat plate provided with passages in the form of holes in it; for the sake of clarity the holes in the plates have not been referred to by reference numerals. For the present invention the design of the contact tray is not critical. For example instead of a sieve tray, a contacting tray comprising gutters as described in the aforementioned U.S. Pat. No. 5,695,548 hereby incorporated by reference may also be used. The horizontal contact trays (23), (24) and (25) are provided with downcomers (26), (27) and (28) respectively. Such a downcomer, which is not disclosed in the aforementioned U.S. Pat. No. 4,361,469 hereby incorporated by reference, has been found advantageous to achieve a easy start-up of such a column. The downcomer (28) opens below the contact tray (25) onto the next lower contact tray (not shown), and so on. In practice the downcomer pertaining to lowermost separation tray of the column will open into the lower part of the column.

The column (22) is provided with a gas inlet and a liquid outlet arranged in its lower end and a liquid inlet and a gas outlet arranged in its upper end; the gas inlet, the liquid outlet, the liquid inlet and the gas outlet are not shown in FIG. 6.

Column (22) is furthermore provided with horizontal separation trays (29), (30) and (31), each separation tray (29), (30) and (31) being arranged below a contact tray (23), (24) and (25). The separation trays (29), (30) and (31) consist of three vertically spaced rows of gutters (4). The U-turn deflector are present but not shown in this Figure for clarity reasons. Each separation tray (29), (30) and (31) is furthermore provided with means for removing liquid from the separation tray in the form of a downcomer (32), (33) and (34). The downcomer (32) of separation tray (29) opens via downcomer (27) on the second contact tray (25) below the separation tray (24), and so on.

The invention will be illustrated with the following non-limiting examples.

EXAMPLE 1

Figure 7:
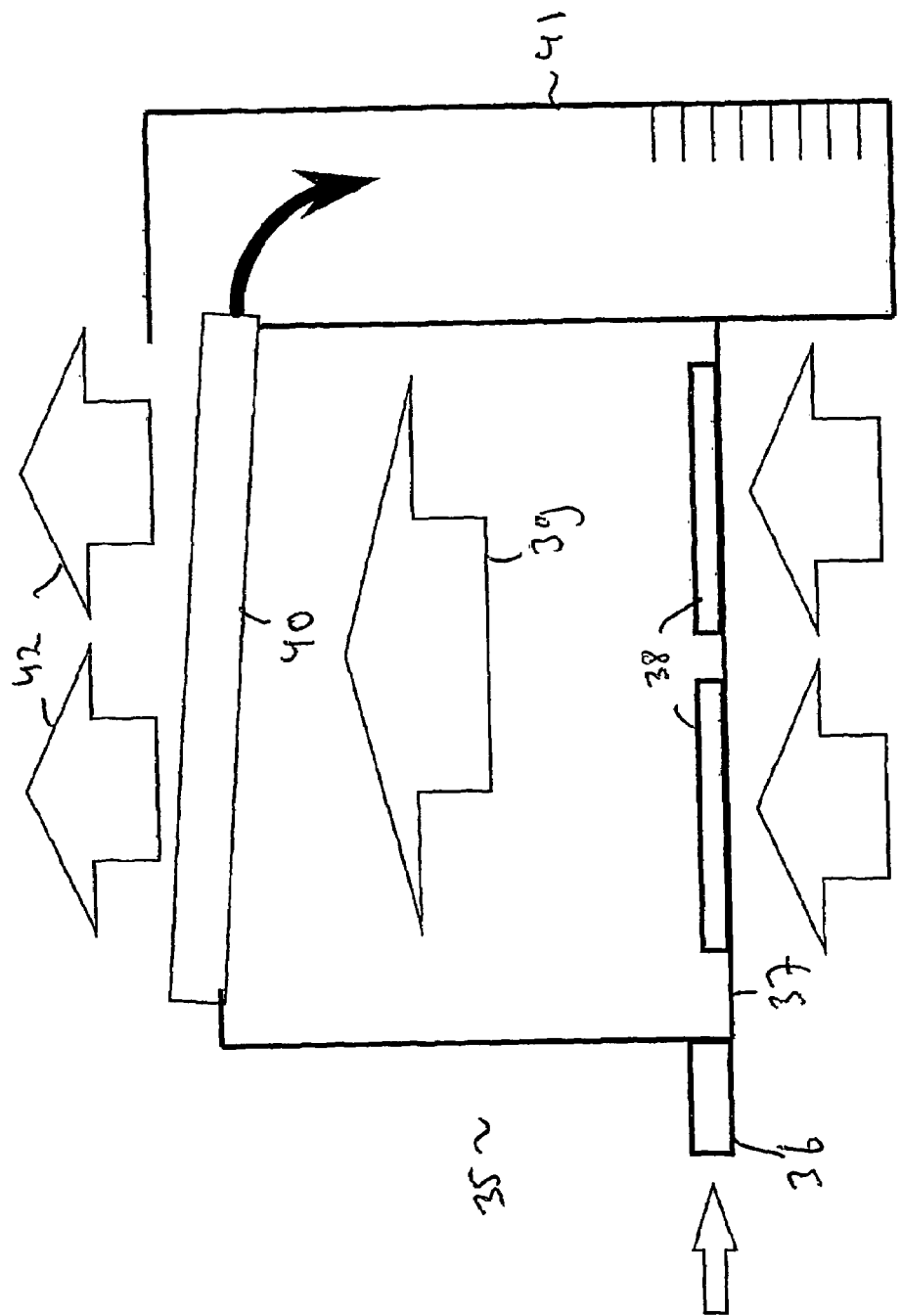
FIG. 7 shows a test set up used to test the gas-liquid separator of the current invention.

A test set up (35) as illustrated in FIG. 7 was used to test the separator according to the invention. In this test set up water was supplied at a rate of 4.25 m$^3$ per hour via (36) to a tray (37) provided with atomisers (38). Air was supplied from below the tray to atomisers (38) resulting in an upwardly moving water-droplets/air mixture (39). Water was separated from this mixture (39) in U-gutter separation deck (40). Separation deck (40) consisted of 4 vertically spaced rows of gutters. The number of parallel oriented gutters was 3, 4, 3, and 4 respectively, counting from below. The V-shaped gutters were provided with an U-turn deflector along the entire length of both upper ends of the upwardly pointed gutter walls. The separated water was collected in vessel (41) and air poor in water (42) was allowed to move upwards above separation deck (40). The ratio of water led into the column to the amount of water collected in vessel (41) was defined as the separation efficiency (%).

Figure 8:
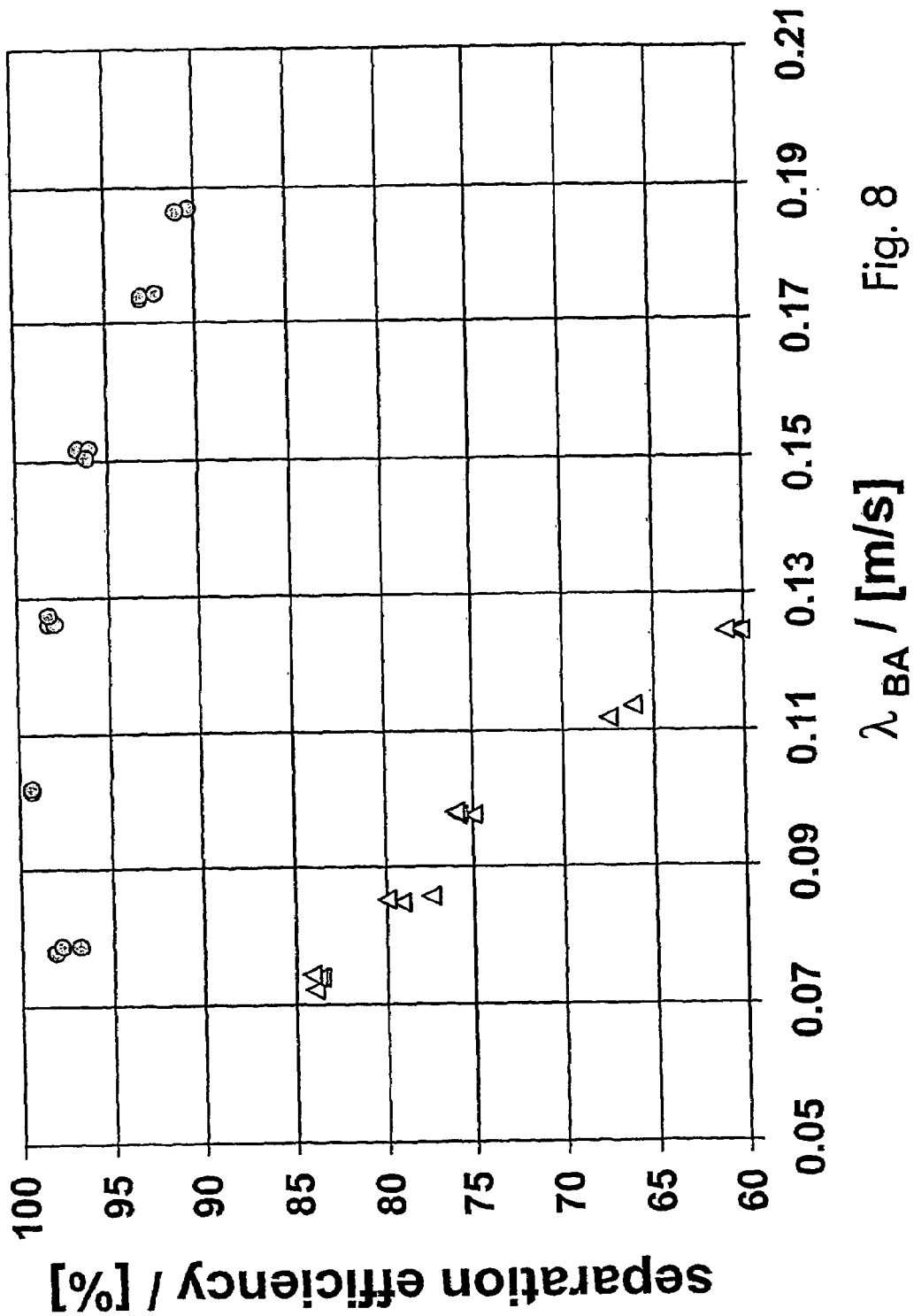
FIG. 8 shows a graph of the separation efficiency of the separator of the present invention compared to a prior art separator.

The volume of air was varied and the separation efficiency at different load factors was measured. The load factor ($\lambda_{BA}$) is here defined as:

$$\lambda_{BA} = \frac{Q_g}{A_{BA}} \sqrt{\frac{\rho_G}{\rho_L - \rho_G}}$$

wherein $Q_g$ is the volume of gas per second (m³/s), $A_{ba}$ is the area of the test set up which is covered by the separator deck (40), $\rho_G$ is the gas density (kg/m³) and $\rho_L$ is the liquid density (kg/m³). FIG. 8 shows that for different load factor values between 0.05 and 0.19 m/s excellent separation efficiencies of above 80% and even above 90% are achieved (circles in FIG. 8 represent results of Example 1).

COMPARATIVE EXPERIMENT A

Example 1 was repeated except that the U-turn deflectors were removed resulting in a separation device as disclosed in U.S. Pat. No. 4,361,469 hereby incorporated by reference. The results are also presented in FIG. 8 as the triangles. From the results it can be concluded that the gas-liquid separator according to the present invention shows improved separation efficiency when compared to the state of the art separator.

EXAMPLE 2

Figure 9:
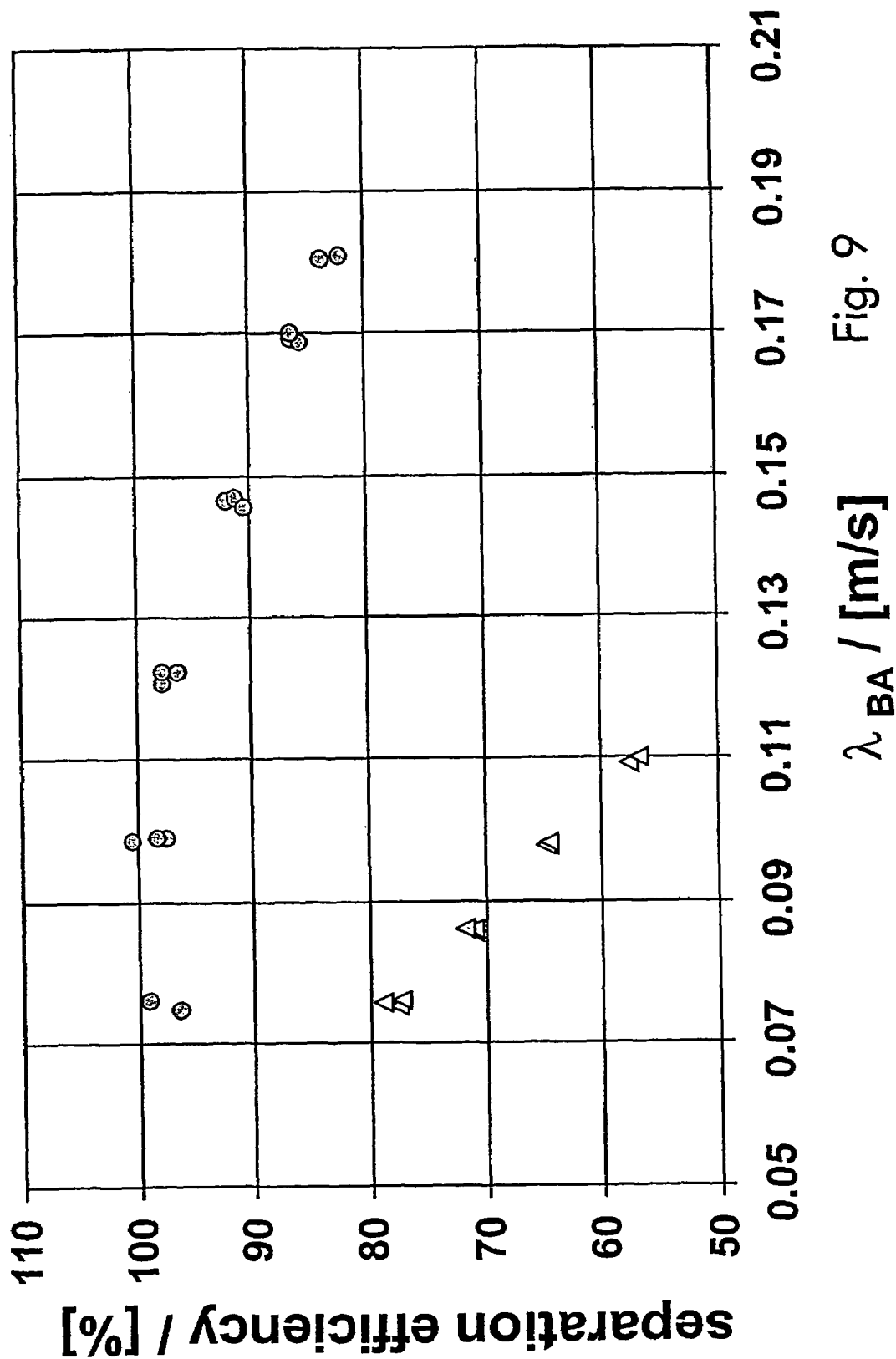
FIG. 9 shows graph of the separation efficiency of the separator of the present invention compared to a prior art separator.

Example 1 was repeated except that water was supplied at a rate of 7.2 m³ per hour. The results are presented in FIG. 9 as the circles.

COMPARATIVE EXPERIMENT B

Example 2 was repeated except that the U-turn deflectors were removed resulting in a separation device as disclosed in U.S. Pat. No. 4,361,469 hereby incorporated by reference. The results are also presented in FIG. 9 as the triangles. From the results it can be concluded that the gas-liquid separator according to the present invention shows improved separation efficiency when compared to the state of the art separator at the high liquid load as in Example 2 and Comparative Experiment B.

I claim:

1. A gas-liquid separator comprising two or more vertically spaced rows of parallel horizontally spaced upwardly facing gutters, said gutters having two upwardly extending gutter walls, wherein the upper end of each of the gutter walls is provided with a U-turn deflector.

2. The gas-liquid separator according to claim 1, wherein the gutters are tilted.

3. The gas-liquid separator according to claim 2, wherein the gutters have a V-shaped cross-sectional design.

4. A gas-liquid separator vessel provided with a gas-liquid inlet and a liquid outlet at its lower end and a gas outlet at its upper end and a gutter separator between said gas-liquid inlet and gas outlet and further provided with means to transport separated liquid from said gutter separator to the liquid outlet, wherein said gutter separator includes two or more vertically spaced rows of parallel horizontally spaced upwardly facing gutters, said gutters having two upwardly extending gutter walls, wherein the upper end of each of the gutter walls is provided with a U-turn deflector.

5. The gas-liquid separator vessel according to claim 4, wherein a coalescer is present between the gas-liquid inlet and the gutter separator.

6. The gas-liquid separator according to claim 4, wherein each gutter has two upwardly extending gutter walls, each of which gutter walls being provided with a U-turn deflector.

7. The gas-liquid separator according to claim 6, wherein the gutters are tilted.

8. The gas-liquid separator according claim 7, wherein the gutters have a V-shaped cross-sectional design.

9. A gas-liquid contacting column provided with a plurality of horizontal contact trays arranged axially spaced apart in the column, wherein above a contact tray a gutter separator comprising two or more vertically spaced rows of parallel horizontally spaced upwardly facing gutters, said gutters having two upwardly extending gutter walls, wherein the upper end of each of the gutter walls is provided with a U-turn deflector is present, said gutter separator further provided with means for removing liquid to a lower position in the column.

10. The gas-liquid contacting column according to claim 9, wherein a contact tray is provided with a downcomer to transport liquid to a next lower contact tray.

11. The gas-liquid separator according to claim 9, wherein each gutter has two upwardly extending gutter walls, each of which gutter walls being provided with a U-turn deflector.

12. The gas-liquid separator according to claim 11, wherein the gutters are tilted.

13. The gas-liquid separator according claim 12, wherein the gutters have a V-shaped cross-sectional design.

14. A gas-liquid separator vessel provided with a gas-liquid inlet and a liquid outlet at its lower end and a gas outlet at its upper end and a gutter separator between said gas-liquid inlet and gas outlet and further provided with means to transport separated liquid from said gutter separator to the liquid outlet, wherein said gutter separator includes two or more vertically spaced rows of parallel horizontally spaced upwardly facing gutters, said gutters having an upwardly extending gutter wall, wherein the upper end of the gutter wall is provided with a U-turn deflector, and wherein a coalescer is present between the gas-liquid inlet and the gutter separator.

15. The gas-liquid separator according to claim 14, wherein each gutter has two upwardly extending gutter walls, each of which gutter walls being provided with said U-turn deflector.

16. The gas-liquid separator according to claim 15, wherein the gutters are tilted.

17. The gas-liquid separator according claim 16, wherein the gutters have a V-shaped cross-sectional design.

18. A gas-liquid separator, comprising a gutter separator comprising at least two vertically spaced rows of a plurality of gutters, wherein at least one gutter of said plurality of gutters having a closed lower side with a first sidewall terminating at a first upper end and a second sidewall terminating at a second upper end thereby defining a gutter interior and providing an open upper side, wherein associated with and spaced away from said first upper end is a first U-turn deflector for directing fluid flow into said gutter interior, and wherein associated with and spaced away from said second upper end is a second U-turn deflector for directing fluid flow into said gutter interior.

19. A gas-liquid separator as recited in claim 18, further comprising: a vessel having an upper end and a lower end and wherein disposed within said vessel between said upper end and said lower end is said gutter separator.

20. A gas-liquid separator as recited in claim 19, wherein said vessel further comprises a gas-liquid inlet device for supplying a gas-liquid mixture into said vessel, wherein said gas-liquid inlet device is positioned below said gutter separator; a liquid outlet providing for fluid communication from within said lower end of said vessel to the outside of said vessel, and a gas outlet providing for fluid communication from within said upper end of said vessel to the outside of said vessel.

21. A gas-liquid separator as recited in claim 20, further comprising: a coalescer disposed within said vessel between said gutter separator and said gas-liquid inlet device.

22. A gas-liquid separator as recited in claim 21, wherein horizontally positioned within said vessel above said gutter separator is a first horizontal contact tray having operatively connected therewith contact tray downcomer means for conveying liquid away from said first horizontal contact tray to a second contact tray that is horizontally positioned within said vessel below said gutter separator.

23. A gas-liquid separator as recited in claim 22, wherein said gutter separator is horizontally positioned within said vessel and operatively connected to gutter downcomer means for conveying liquid away from said gutter separator into said gutter downcomer means.

24. A gas-liquid separator as recited in claim 23, wherein said at least one gutter of said plurality of gutters has a V-shaped cross-sectional design.

* * * * *